United States Patent [19]

Huston

[11] Patent Number: 5,286,063
[45] Date of Patent: Feb. 15, 1994

[54] BALL AND SOCKET FLOATING SEAL ASSEMBLY

[75] Inventor: Douglas A. Huston, North Canton, Ohio

[73] Assignee: The Babcock & Wilcox Company, New Orleans, La.

[21] Appl. No.: 113,026

[22] Filed: Aug. 27, 1993

Related U.S. Application Data

[63] Continuation of Ser. No. 001,886, Jan. 8, 1993, abandoned.

[51] Int. Cl.⁵ ............................................. F16L 27/00
[52] U.S. Cl. ........................................ 285/11; 277/53; 277/31; 285/261; 285/266; 285/298; 285/223; 285/272
[58] Field of Search ................... 277/30, 31, 53, 54; 165/4, 9; 285/11, 261, 263, 266, 273, 298, 272

[56] References Cited

U.S. PATENT DOCUMENTS

| | | | |
|---|---|---|---|
| 393,139 | 0/1888 | Bodycomb | 285/278 X |
| 545,268 | 0/1895 | Campbell | 285/278 |
| 986,635 | 0/1911 | Kirk . | |
| 1,163,941 | 0/1915 | Miller | 285/278 |
| 1,221,707 | 0/1917 | Durbin . | |
| 1,421,449 | 0/1922 | Gamage . | |
| 1,564,270 | 0/1925 | Phillips, Jr. . | |
| 1,701,898 | 0/1929 | Seifert | 285/278 |
| 2,410,589 | 0/1946 | Segerharst | 166/14 |
| 2,712,458 | 0/1955 | Lipson | 285/334.1 X |
| 3,076,667 | 0/1963 | Klingler | 285/98 |
| 3,404,904 | 10/1968 | Roe | 285/266 |
| 3,626,770 | 0/1971 | Lindberg et al. | 74/18.2 |
| 3,752,509 | 0/1973 | Stafford | 285/334.4 |
| 3,754,779 | 8/1973 | Peress | 285/11 |
| 3,936,079 | 0/1976 | Ekman | 285/98 |
| 4,114,680 | 0/1978 | Kritzler et al. | 165/4 |
| 4,185,837 | 1/1980 | Greene | 277/30 |
| 4,253,435 | 0/1981 | McCandless | 277/216 |
| 4,311,313 | 1/1982 | Vedova et al. | 277/30 |
| 4,331,338 | 0/1982 | Caldwell et al. | 277/58 |
| 4,339,108 | 0/1982 | Daniluk | 285/190 |
| 4,396,212 | 0/1983 | Honke | 285/98 |
| 4,449,738 | 0/1984 | Hotger | 285/11 |
| 4,468,056 | 0/1984 | Kramer et al. | 285/281 |
| 4,478,438 | 0/1984 | Elorriaga, Jr. | 285/98 |
| 4,498,874 | 0/1985 | Pichl | 285/305 |
| 4,561,680 | 12/1983 | Gerber | 285/98 |
| 4,659,114 | 4/1987 | Gerber | 285/11 |
| 4,705,098 | 11/1987 | Gerber et al. | 165/4 |
| 4,984,827 | 1/1991 | Peppel et al. | 285/263 |
| 5,029,632 | 2/1991 | Huston | 165/4 |

FOREIGN PATENT DOCUMENTS

| | | | |
|---|---|---|---|
| 537764 | of 1959 | Belgium | 285/261 |
| 361186 | of 1922 | Fed. Rep. of Germany | 285/278 |
| 7554 | of 1838 | United Kingdom | 285/278 |
| 1170953 | of 1969 | United Kingdom | 285/224 |
| 2224058 | 4/1990 | United Kingdom | 285/11 |

*Primary Examiner*—Eric K. Nicholson
*Attorney, Agent, or Firm*—Robert J. Edwards; Vytas R. Matas; Eric Marich

[57] ABSTRACT

An improved rotating pipe joint for use in the sootblower system of a rotary regenerative air heater employs a ball and socket type construction floating seal assembly. The ball and its associated seal rings rotates within the socket to allow a slide pipe of the sootblower system to deviate from the vertical position while maintaining sealing. The improved rotating pipe joint also accommodates rotary, axial and lateral motion between the moving and stationary parts of the air heater.

5 Claims, 3 Drawing Sheets

BALL AND SOCKET FLOATING SEAL ASSEMBLY

This is a continuation of application Ser. No. 08/001,886 filed Jan. 8, 1993 now abandoned.

BACKGROUND OF THE INVENTION

1. Field of the Invention

The present invention relates, in general, to a rotating pipe joint which permits two substantially axially aligned joined pipes to move axially, laterally and rotationally relative to one another and, in particular, to a rotating pipe joint which has an improved floating seal assembly which permits an amount of angular misalignment between the rotating and stationary pipes while still providing an acceptable seal.

2. Description of the Related Art

The present invention responds to the continuing need in the air heater industry for an effective seal assembly for sealing the fluid conveying duct to the sootblower of a Rothemuhle air heater while permitting the two joined pipes to rotate relative to one another. The invention is applicable wherever a rotating pipe joint is required in a hostile environment and a less than complete seal is satisfactory.

In a Rothemuhle air heater, the heat transfer surfaces comprise a stationary stator, which is too large to be desirably rotatable. A hood above the stator and a hood below the stator rotate in unison, connected by a single, axial, hollow, rotating, centering post. Aligned rotating portions of the upper and lower hoods provide one passageway for gas through the air heater heat transfer surfaces. The remaining hood portions provide another passageway. The rotating hood portions may conduct flue gas or air, depending on the needs of a particular installation. The remaining hood portions conduct whichever fluid the rotating hood portion does not conduct. As the hoods rotate, the heat transfer surfaces are alternately heated by flue gas and cooled by incoming combustion air.

The flue gas deposits deleterious materials, such as carbon, fly ash, etc., onto the heat transfer surfaces, reducing their ability to transfer heat. Periodic removal of these materials from the heat transfer surfaces is required to obtain efficient operation and long life from the air heater. Sootblowers have long been used for cleaning air heaters while they are in service. In a Rothemuhle air heater, the sootblower is attached to the upper or lower rotating hood so that it rotates in unison with the rotating hood. In some cases a separate sootblower is attached to each rotating hood. The sootblower orifices are aligned to blow high pressure fluid, customarily air or dry steam, into the heat transfer surfaces of the air heater to dislodge the accumulated deleterious materials. Typically a single sootblower is provided on the "cold" side of the air heater, but in some cases a sootblower may also be provided on the "hot" side as well. The air heater hoods rotate in the range of about 1 to about 2 rpm.

A rotating centering post provides a common drive for the upper and lower hoods, serves as a pipe which conveys the fluid to the sootblower, and is connected to a stationary inlet pipe; as such, the rotating joint between them must accommodate this rotation and provide an acceptable seal. The joint must survive in the hostile environment of the air heater where temperatures of 650° F. or more are typically encountered. In addition, the rotating joint is inaccessible while the air heater is in service, and is difficult to reach in any event.

The air heater is most conveniently removed from service for maintenance during regularly scheduled boiler maintenance, typically scheduled once a year. If the air heater must be removed from service while the boiler is operating, as would be required if the sootblower fails because the sliding seal or the expansion joint has failed, several undesirable effects occur. The air heater must be allowed to cool, which increases unit downtime. More importantly, the boiler itself must usually be removed from service if the air heater is stopped for maintenance. Skilled workers must enter the air heater, discern the cause of the sootblower failure, and replace the defective parts. The sliding seal itself could cost several thousand dollars, and the additional costs incurred in an unscheduled shutdown of the air heater and boiler make failure of the sliding seal especially expensive and undesirable.

One solution to the above-identified problems is shown in U.S. Pat. No. 4,659,114 to Gerber—ROTATING PIPE JOINT HAVING A FLOATING SEAL, assigned to The Babcock & Wilcox Company. A sketch of this floating seal assembly is provided in FIG. 1 of the present disclosure. As set forth therein, the rotating pipe joint 10 includes a stationary inlet pipe 12 and slide pipe 14 slidably and rotatably connected via a housing 16 to a rotating centering post 18. The housing 16 is defined by a thrust plate 20, spacer plate 22, and a flange 24. The flange 24 is fixedly connected to the rotating centering post 18 by means of a support pipe 26, bolts 28, and a base 30. The housing 16 encloses a floating seal 32 comprising a collar 34, preferably having a plurality of compression rings 36 which are inwardly biased against the slide pipe 14 to provide a seal between the slide pipe 14 and the collar 34. Rotational and axial movement, the latter due to thermal expansion, are accommodated between the slide pipe 14 and the compression rings 36. A limited amount of lateral movement, in the range of $\frac{3}{4}''$ to $1\frac{1}{2}''$ from the vertical centerlines of the two pipes 12 and 18, is accommodated by an aperture 38 in the thrust plate 20 and by virtue of the fact that the outside diameter of the collar 34 is smaller than the inside diameter of the housing 16, which defines an inner chamber 40. Gaps 42 and 44 vary in size, depending upon the degree of pressurization of the chamber 40. In operation, the upper surface of collar 34 is thrust against thrust plate 20, eliminating gap 42 and sealing the joint. At this point, most relative rotation occurs between the collar 34 and the slide pipe 14, since the collar 34 tends to stick to the thrust plate 20.

FIGS. 2 and 3 show various known constructions of the collar 34 shown in FIG. 1. In FIG. 2, for example, collar 34 is provided with the aforementioned compression rings 36 seated in grooves 46, gaps 48 occurring at the ends of the compression rings 36 being staggered to further reduce leakage. In FIG. 3, another known construction for the collar is shown, designated therein as 34', wherein aperture 50 is tapered about 5°, although tapers of 3° to 15° are acceptable, to accommodate toggling of the slide pipe 14 within the collar 34' without adversely affecting the seal.

While the construction of U.S. Pat. No. 4,659,114 represents an advance in the art, room for further improvement exists. Accordingly, it has become desirable to develop a rotating pipe joint which has an improved floating seal assembly which permits an amount of angular misalignment between the rotating and stationary pipes while still providing an acceptable seal.

SUMMARY OF THE INVENTION

The present invention improves upon the rotating pipe joints of the type disclosed in U.S. Pat. No. 4,659,114 by employing a ball and socket type construction floating seal assembly. The ball and its associated seal rings rotates within the socket to allow a slide pipe of the sootblower system to angularly deviate from the vertical position while maintaining sealing. The improved rotating pipe joint assembly also accommodates rotary, axial and lateral motion between moving and stationary parts of the air heater.

The various features of novelty which characterize the invention are pointed out with particularity in the claims annexed to and forming a part of this disclosure. For a better understanding of the invention, its operation and specific advantages attained by its uses, reference is made to the accompanying drawings and descriptive matter in which a preferred embodiment of the invention is illustrated.

DESCRIPTION OF THE PREFERRED EMBODIMENT

Figure 1:
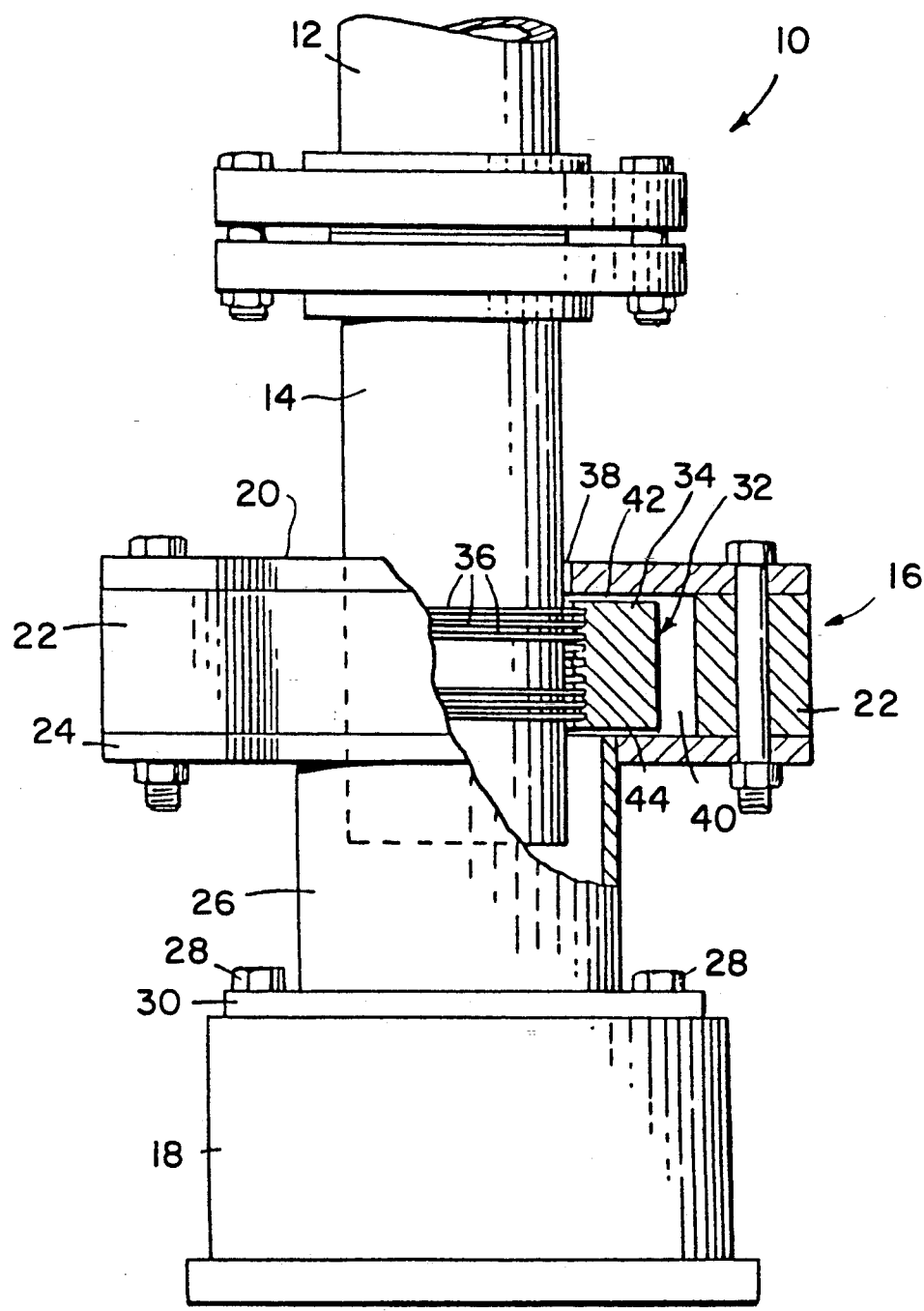
FIG. 1 is a side elevation in partial cross-section of a prior art rotating pipe joint having a floating seal assembly according to the teachings of U.S. Pat. No. 4,659,114.
Figure 2:
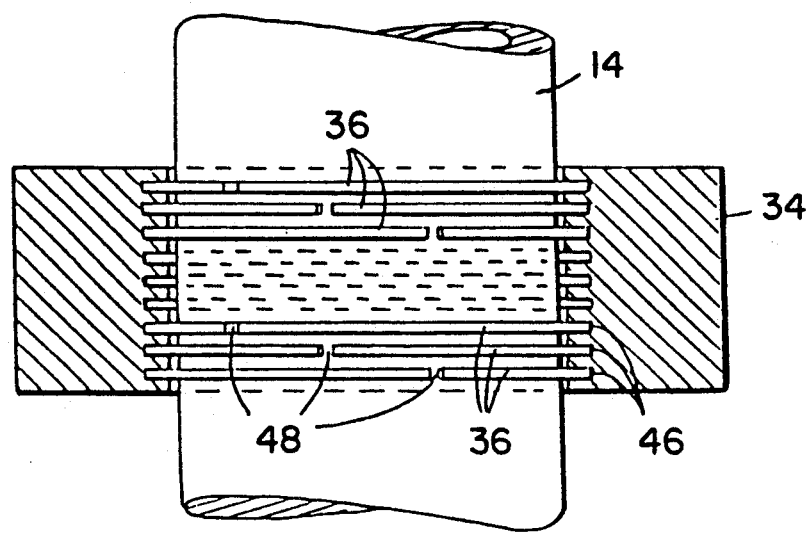
FIG. 2 is a side elevation of the prior art floating seal assembly of the rotating pipe joint of FIG. 1.
Figure 3:
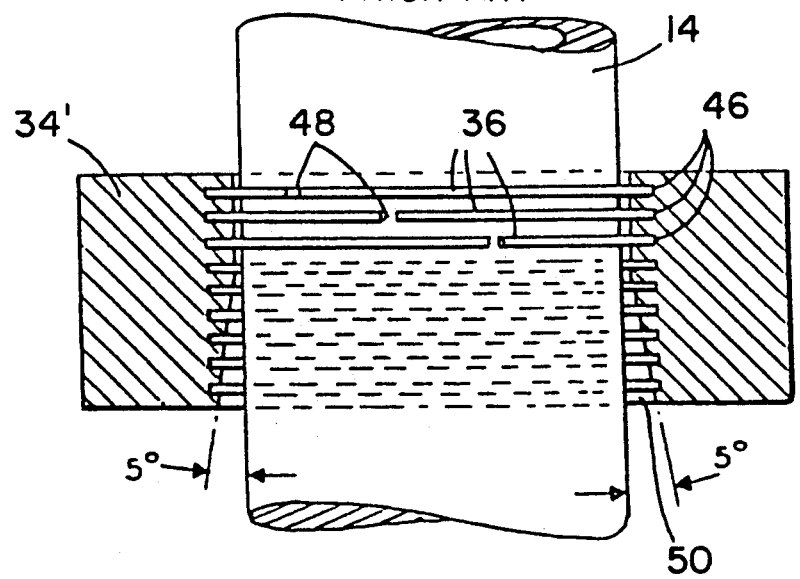
FIG. 3 is a side elevation of another embodiment of the prior art floating seal assembly of FIG. 2.
Figure 4:
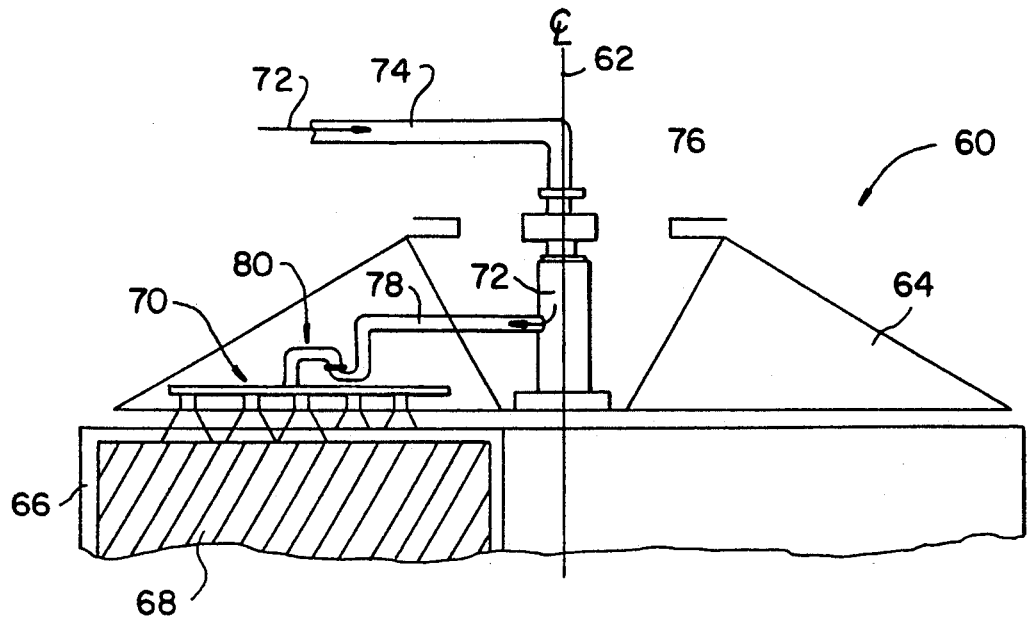
FIG. 4 is a schematic sectional side view of a conventional, rotating hood, regenerative air heater having a sootblower system mounted on the hood to clean the stationary heating surface.

Referring to the drawings generally, wherein like numerals designate the same element throughout the several drawings, and to FIG. 4 in particular, there is shown a schematic sectional side view of the upper end of a rotating hood, regenerative air heater 60 having a vertical axis of rotation 62. Typically, this would be the "hot" end of the air heater 60; i.e., the location where both the hot flue gas enters the air heater 60 and the heated air for combustion leaves the air heater 60. For the sake of clarity, only the upper rotating hood 64 has been shown, located above a stator 66 which houses an arrangement of heating surface 68. It will be appreciated that the present invention can be employed in air heaters 60 having sootblowers 70 provided only at the upper end (as shown) or at the lower end (not shown) or in combination.

The sootblowing media itself is schematically indicated in the Figures by arrows 72. The media may be air or dry steam. The media is provided to the air heater 60 by an inlet pipe 74 through an improved rotating pipe joint 76 and thence into the sootblowers 70. The sootblowers 70 are attached to the rotating hoods 64 for rotation therewith. As the sootblowers 70 sweep over the stationary heating surface 68, media discharged from the sootblowers 70 dislodges accumulated deposits from the heating surface 68, thereby improving heat transfer efficiency and reducing draft loss and air resistance through the air heater 60. Interconnecting the improved rotating pipe joint 76 and the sootblowers 70 is a pipe 78 in combination with a pair of spherical swivel joint assemblies interconnected by a U-shaped conduit section, schematically shown as 80 in FIG. 4. For details concerning one type of construction for these assemblies 80, reference is made to U.S. Pat. No. 4,561,680 to Gerber —SWIVEL JOINT ASSEMBLY, assigned to The Babcock & Wilcox Company.

Figure 5:
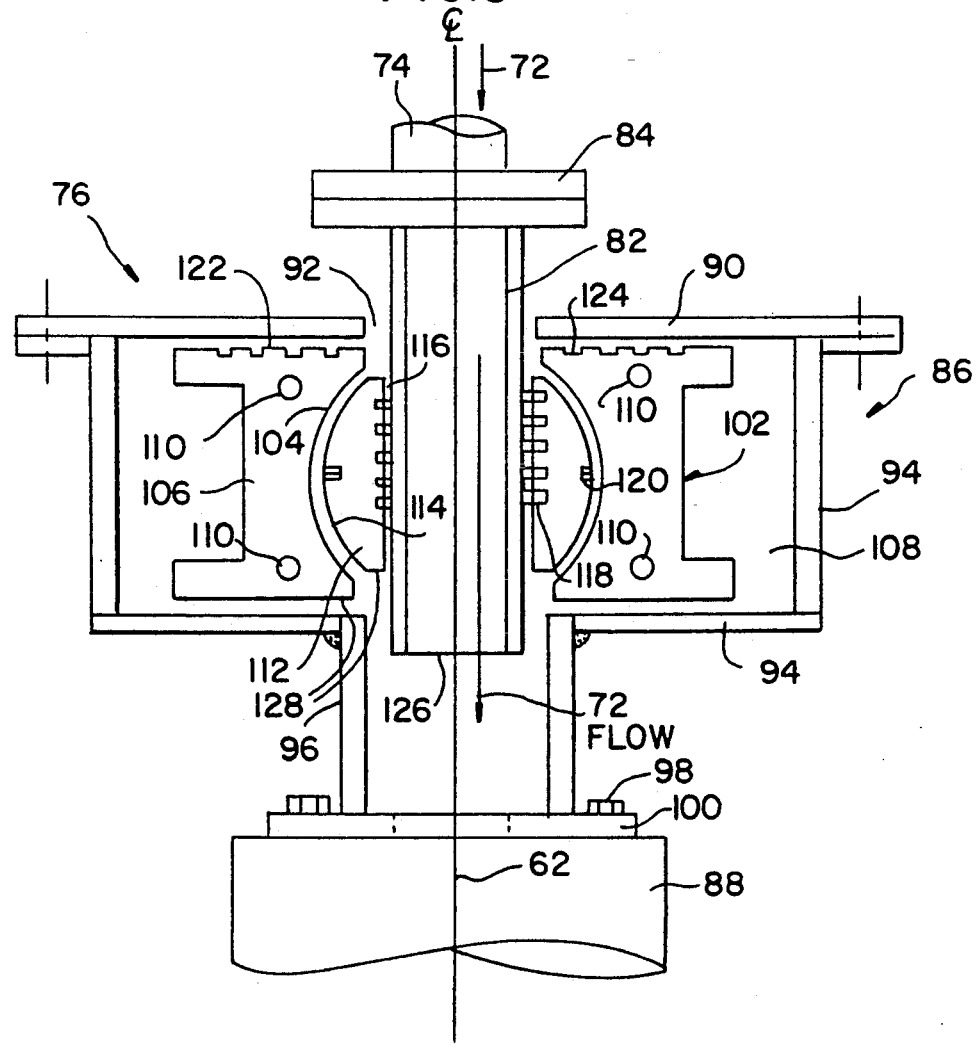
FIG. 5 is a schematic sectional view of the improved rotating pipe joint having a ball and socket floating seal assembly according to the teachings of the present invention.

Turning now to FIG. 5, there is shown a schematic sectional view of the improved rotating pipe joint 76. The rotating pipe joint 76 has a slide pipe 82 connected at a first end to the inlet pipe 74 by means of a flange 84. The slide pipe is connected via a housing 86 to a rotating centering post 88. The housing 86 is defined by a thrust plate 90 having an aperture 92 that is removably connected to a lower rotatable housing portion 94. The lower rotatable housing portion 94 is fixedly connected to the rotating centering post 88 by means of a support pipe 96, bolts 98 and base 100. As will be described herein, the construction of the improved rotating pipe joint 76 allows for sliding, rotation, lateral, and angular movement between the slide pipe 82 and the rotating centering post 88.

In accordance with the present invention, the housing 86 encloses a ball and socket floating seal assembly 102. A collar 106 carries a spherical socket portion 104. Collar 106 is advantageously made of two halves bolted together at bolt locations 110 and rotatably secures ball 112 therein. Ball 112 has an outer spherical surface 114 which is rotationally received by the cooperating concave inner spherical surface of socket portion 104. The center of the ball 114 is provided with a central, cylindrical aperture 116 which slidably (axially with respect to a vertical axis of rotation 62 of the air heater 60) and rotationally receives the slide pipe 82 therethrough. The central, cylindrical aperture 116 is provided with a first set of compression sealing rings 118, accepted in suitably designed grooves, which rub against an outside diameter of the slide pipe 82 to form a seal. The outer spherical surface 114 of ball 112 is provided with a second set of one or more compression rings 120, accepted again in suitably designed grooves, which rub against an inner surface of the spherical socket portion 104 of the collar 106 to form another seal.

A top surface 122 of the collar 106 is provided, as is presently done in the prior art floating seal assemblies of the type shown in U.S. Pat. No. 4,659,114, with a plurality of concentric grooves 124 which form a labyrinth seal when the top surface 122 presses against an underside of the thrust plate 90, when the rotating pipe joint 76 is pressurized with air or dry steam during operation.

The length of the slide pipe 82 is specifically chosen such that its discharge end portion 126 extends completely through the ball 112 under all thermal expansion operating conditions. Since the purpose of the present ball and socket floating seal assembly 102 is to provide for a degree of angular misalignment between the slide pipe 82 and the rotating centering post 88, the size of the aperture 92 in the thrust plate 90 is chosen to be sufficiently large enough to prevent contact of the slide pipe 82 with the sides of the aperture 92 during expected air heater operating conditions. Since the discharge end 126 of the slide pipe 82 extends into the support pipe 96, clearance is provided between the discharge end 126 and the inside diameter of the support pipe 96 to prevent contact therebetween during expected air heater operating conditions.

The slide pipe 82 outer diameter and collar 106 spherical socket surface 104 may be coated with a thin, hard material such as tungsten carbide to resist friction wear. The tungsten carbide material is deposited by high velocity oxygen fuel metal spray process and ground to a 16 RMS finish.

While specific embodiments of the invention have been shown and described in detail to illustrate the application of the principles of the invention, it is understood that the invention may be embodied otherwise without departing from such principles. Similarly, while the present improved floating seal assembly is designed to be easily retrofitted into existing air heater installations to replace leaking or failed structures, the invention can be employed in new air heater construction.

What is claimed is:

1. A pipe joint assembly for sealably connecting two substantially axially aligned pipes for conveyance of a pressurized fluid therebetween, one of the pipes rotating with respect to the other, which permits an amount of angular misalignment between rotating and stationary pipes while still maintaining an acceptable seal, comprising:

a stationary inlet pipe;

a slide pipe having a first end portion fixed to the stationary inlet pipe and a second end portion opposite the first end portion;

a ball and socket floating seal assembly mounted on the slide pipe for axial, rotational and angular motion relative to the slide pipe, the seal assembly including a ball having an aperture which axially and rotatably receives the slide pipe therethrough, the ball being located on the slide pipe between its first and second end portions, and including a two-part collar defining a socket which rotatably and angularly receives the ball therein, a first set of compression rings mounted on the ball and axially spaced within the aperture to provide a seal between the slide pipe and the ball, and a second set of compression rings mounted on an outside surface of the ball to provide a seal between the ball and the socket;

a rotatable housing having a thrust plate with an aperture which receives the slide pipe therethrough and a lower housing portion which, together with the thrust plate, defines a chamber which receives the second end portion of the slide pipe and the ball and socket floating seal assembly;

a support pipe fixed to the housing;

a rotating centering post fixed to the support pipe for rotation therewith;

means for passing the pressurized fluid from the stationary inlet pipe through the slide pipe from the first end portion to the second end portion and into the chamber to pressurize the chamber and the rotating centering post, the top surface of the collar being spaced from the thrust plate to form a gap when the chamber is depressurized, and bottom surfaces of the collar, ball and socket being exposed to the pressurized fluid during operation of the assembly when the chamber is pressurized so that the ball and socket floating seal assembly moves relative to the slide pipe due to the pressurized fluid to close the gap between the top surface of the collar and the thrust plate; and wherein the ball and its associated seal rings rotates within the socket to accommodate angular misalignment of the stationary inlet pipe and the rotating centering post during air heater operation, diameters of the aperture in the thrust plate and of the inside of the support pipe being large enough to prevent contact between the slide pipe and both the thrust plate and support pipe when such angular misalignment occurs.

2. The assembly of claim 1, wherein the first set of compression rings is an arrangement of five axially spaced compression rings.

3. The assembly of claim 1, wherein the second set of compression rings is a single compression ring.

4. The assembly of claim 1, wherein the outer diameter of the slide pipe and collar spherical socket surfaces are coated with an abrasion resistant coating.

5. The assembly of claim 4, wherein the abrasion resistant coating is tungsten carbide material having a 16 RMS surface finish.

* * * * *